United States Patent [19]

Neff et al.

[11] 4,003,338

[45] Jan. 18, 1977

[54] AQUATIC ANIMAL CAGE AND FABRICATION METHOD

[75] Inventors: Gregor N. Neff, Dobbs Ferry, N.Y.; Paul C. Barrett, Homestead, Fla.

[73] Assignee: Gregor N. Neff, Dobbs Ferry, N.Y.

[22] Filed: Jan. 29, 1975

[21] Appl. No.: 545,149

[52] U.S. Cl. .................................. 119/3
[51] Int. Cl.² ............................... A01K 63/00
[58] Field of Search .......... 119/3; 43/11; 220/19; 150/51

[56] References Cited
UNITED STATES PATENTS

| | | | |
|---|---|---|---|
| 463,964 | 11/1891 | Gates | 150/51 |
| 2,548,966 | 4/1951 | Gilmore | 220/19 X |
| 2,783,573 | 3/1957 | Rau | 43/11 |
| 3,717,124 | 2/1973 | Jacobs | 119/3 |

*Primary Examiner*—Hugh R. Chamblee
*Attorney, Agent, or Firm*—Curtis, Morris & Safford

[57] ABSTRACT

An enduring cage for fish or other aquatic animals is provided. The structure of the cage is such that it can be made of deterioration-resistant materials at a reasonable cost. The cage has a top frame made of bent aluminum tubing or pipe. The tubing is slit so that it has a horizontal gap or slot into which are inserted the upper edges of flexible netting side walls. The top frame is strengthened by the use of an aluminum top sheet inserted into the same slot as the upper edges of the netting and forming a partial cover for the top of the cage. The tubing then is clamped, by means of bolts inserted through holes in the tubing, and the edges of the netting and the top sheet. The netting and top sheet are held tightly and evenly in place. The side walls and bottom of the cage are made of netting panels which are fastened together at their edges to form seams. The seams are formed by slitting conventional polyethylene tubing, inserting the edges of two side walls into the tubing, and stapling through the tubing. The cage preferably has flotation material to support the cage on a body of water with the top above water. The cage also preferably has a hinged aluminum lid with a hole through which feed can be deposited into the cage.

20 Claims, 5 Drawing Figures

AQUATIC ANIMAL CAGE AND FABRICATION METHOD

This invention relates to aquatic animal cages, and particularly to cages for rearing or storing fish in the water.

One of the most ancient and venerable methods of aquaculture is cage culture — the raising of aquatic animals such as fish in floating cages. A major advantage of this method is that it permits the use of natural bodies of water for the rearing of the fish, and makes harvesting a relatively simple matter. One of the major disadvantages of cage culture is the cost of the cages. A major contributing factor to this cost has been the lack of longevity of the cages.

One prior type of cage uses a wooden frame with wire mesh side walls secured to the frame. Such a cage does not last very long. Unless the wood is painted or treated regularly, and the wire is coated with tar or some other protective material frequently, the cage will rust or rot away rather quickly. Even with such maintenance, the life can be extended only somewhat — the cage still deteriorates relatively quickly. Of course, the maintenance requirements increase the effective cost and reduce the desirability of the cage.

Other prior cages have eliminated the wood frames and use only iron or steel mesh, either uncoated, or coated with a plastic material such as polyvinylchloride (PVC), with fasteners at the corners to hold the cage together. The fasteners and the wire still rust, at least where the ends are cut, and the cage still has a relatively short life. Moreover, the lack of a skeletal structure for the cage makes it difficult to handle.

Some prior cages have used nylon or plastic netting instead of wire mesh for the cage walls. However, an economical and durable structure for attaching the netting to the frame has proved difficult to devise. As a result, such prior cages generally are expensive and/or cumbersome to use and often do not have the strength necessary to enable the user to lift the cage out of the water with a full load of fish. Furthermore, in some such cages, the frame or top of the cage still is subject to rust, rot or other such deterioration.

Almost every prior cage cage has been heavy and bulky, thus making it difficult to handle and use.

In accordance with the foregoing, it is an object of the invention to provide an aquatic animal cage which is durable and will not quickly corrode, rust, rot or otherwise deteriorate under the natural conditions prevailing in aquaculture. It is a further object of the invention to provide such a cage which is relatively economical to build and use. It is another object of the invention to provide such a cage which is strong and can be used to safely lift a full load of fish or other aquatic animals out of the water. It is still another object to provide such a cage which is easy to unload, either with a dip net, or by dumping. It is still a further object to provide such a cage which is relatively easy to repair and requires virtually no painting, tarring or other maintenance. It is another object to provide such a cage which is light in weight and easy to carry. It is yet another object to provide such a cage which is foldable so as to be compact for storage and transportation, and yet will provide full growing space for the fish in it. It is another object to provide such a cage in which the edges of the netting forming the walls of the cage are fully protected against snagging and ripping.

The foregoing objects are met by the provision of an aquatic animal cage having a frame including an elongated netting support member with a re-entrant cross-sectional shape (e.g., circle, square, triangle, etc.) and a longitudinal gap. The edges of the netting material are located within the gap and holding means is provided for causing the edges of the support member to hold the netting. The support member preferably is metal tubing which is slit in selected locations to form the gap, and then is bent to form the corners of the cage top. A sheet is inserted into the same slot as the edges of the netting. Then, the tubing is clamped shut. This can be done by means of a press brake, but preferably is done by means of threaded fasteners such as bolts which are inserted through the tubing, the edges of the netting, and the edges of the sheet to hold the parts together in a strong, unified assembly. The edges of the netting are fastened together by means of re-entrant cross-sectionally shaped flexible material such as plastic tubing which is slit, and then is fitted over the edges of the netting and stapled in place. Non-corrodable materials are used throughout.

The foregoing and other objects and advantages of the invention will be set forth in or apparent from the following description and drawings.

GENERAL DESCRIPTION

Figure 1:
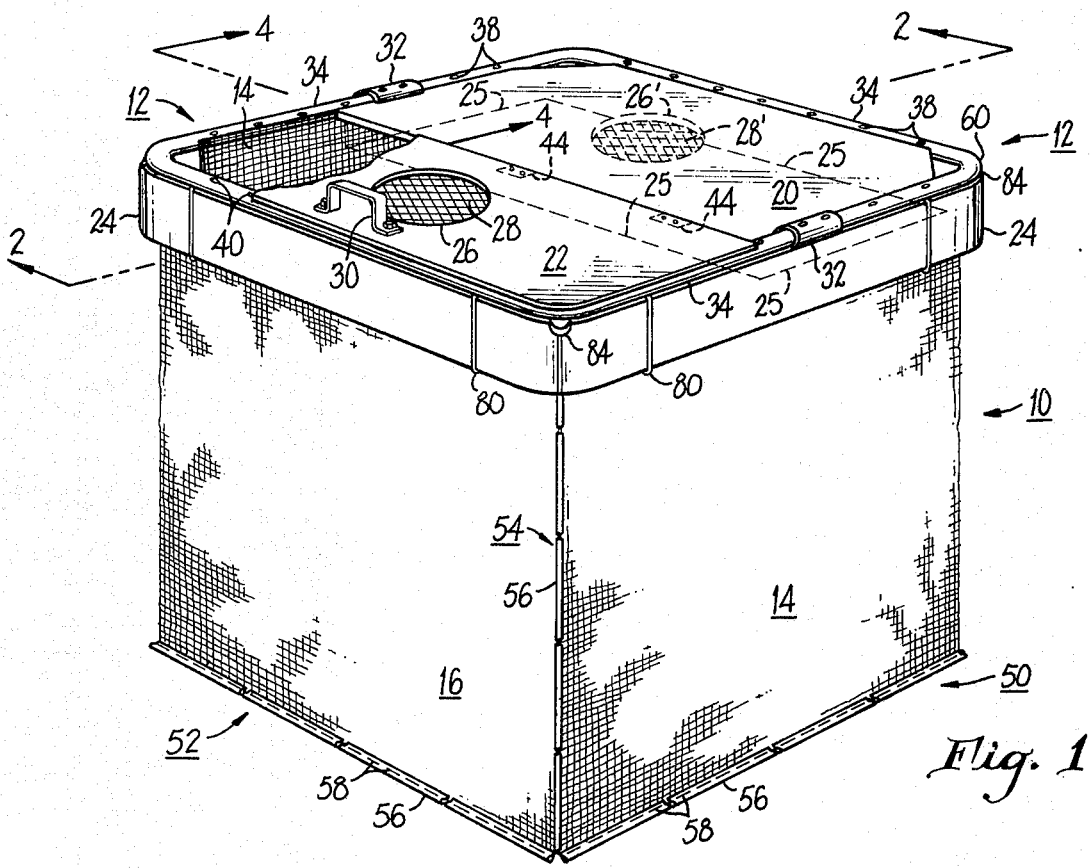
FIG. 1 is a perspective, partially broken-away view of the preferred embodiment of cage of the present invention.
Figure 2:
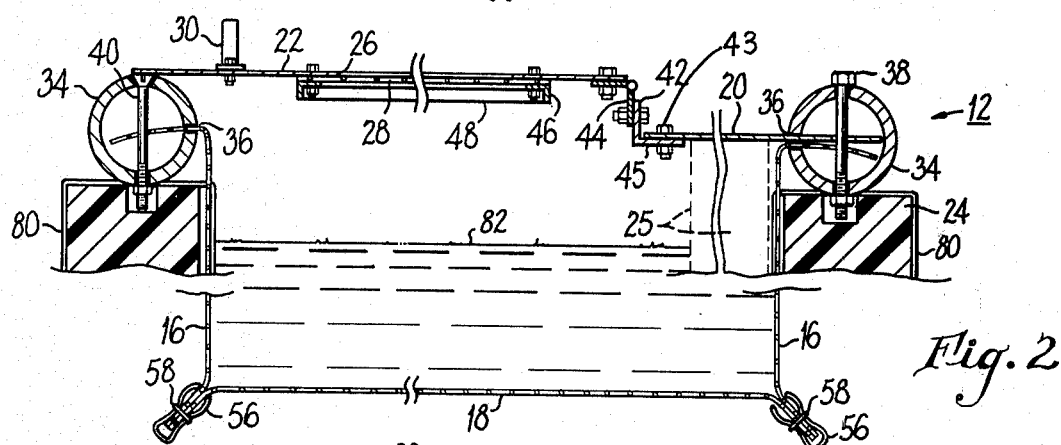
FIG. 2 is a partially broken cross-sectional view of the cage taken along line 2—2 of FIG. 1.

The cage 10 shown in FIG. 1 has a top frame indicated generally at 12, four side walls 14 and 16, and a bottom wall 18 (see FIG. 2). The cage 10 also has an integral top sheet or plate 20 partially covering the top of the cage, and a hinged lid 22 covering the remainder of the top of the cage. A portion of the lid 22 is broken away to show some of the internal construction of the cage.

The cage has a float collar 24 formed of buoyant plastic material fastened to the cage by means of plastic straps 80. The float collar supports the cage on a body of water in which most of the cage is immersed for holding aquatic animals. A typical level of the water relative to the float collar 24 is shown in FIG. 2 at 82.

The hinged lid 22 has a feed hold 26 with a grille 28 covering the hole 26. The hole permits feed to be thrown into the cage to feed fish or other animals therein, and the grille 28 keeps out predators, such as snakes and birds. A handle 30 is provided to facilitate lifting of the lid.

TOP CONSTRUCTION

Referring now to FIG. 2, as well as FIG. 1, the top frame 12 includes an aluminum tube 34 which is bent into a rectilinear shape. The tubing 34 actually is composed of two sections, a front section and a rear section which are joined by means of connectors 32.

Referring again to FIG. 2, as well as FIG. 1, the tubing 34 has slits or gaps 36 extending from near one bend to near the other bend on each of the four sides of the cage. Inserted into each gap 36 is the upper end of one of the side walls 16 or 14 of the netting material forming the cage. Also inserted into the gap 36 are the edges of the top plate or sheet 20, which also is made of aluminum. As it is shown in FIG. 1, the rear corners of the sheet 20 are cut away diagonally. This assembly then is secured together by means of bolts 38 which are inserted completely through the tubing 34, as well as through the ends of the netting 16 and top plate 20 which are located inside the tube 34. Then, nuts are applied to the bolts, and the nuts are tightened so that the edges of the tubing 34 at the gap 36 clamp down on the top sheet 20 and the netting ends to hold them securely in place.

The bolts 40 used along the front portion of the top frame have beveled heads and are fitted into countersunk holes in the top of the tubing 34 so that there is no gap between the lid 22 and the top of the tubing 34 upon which the lid rests.

Figure 4:
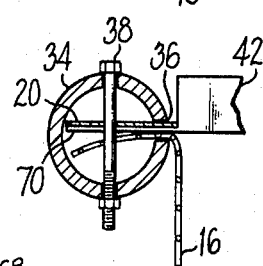
FIG. 4 is a cross-sectional view taken along line 4—4 of FIG. 1.

Still referring to FIG. 2, a cross-support 42 is secured between opposite sides of the cage top. As is shown in FIG. 4, as well as in FIG. 2, the cross-support 42 is a piece of angle-shaped aluminum with its ends cut so as to leave flat tabs 70 which are inserted into the gap 36 in the tubing 34. Then a hole is drilled and bolt 38 is inserted through the hole in tab 70 and the sheet 20 and end of the netting to hold the cross-member 42 in place. The top plate 20 is secured to the lower flange 45 of the angle 42 by means of bolts and nuts 43 (see FIG. 2) at spaced intervals along the lower flange 45.

Secured to the vertical flange of the cross-member 42 are three hinges 44 which also are secured to the lid 22. The vertical flange supports the hinges at the elevated level of the top of the tubing 34 so as to ensure that the lid 22 will be level and form a gap-free fit with the top of the tubing.

The feed hole 26 has a piece of plastic netting secured beneath the hole 26 to form the grille 28. The netting has holes on the order of ½ inch square so as to allow food pellets to be deposited through the holes without opening the lid, but prevent snakes, birds, and other predators from entering the cage.

Referring to FIG. 2, the grille 28 is held in place by four pieces of angle aluminum 46 and 48 which are bolted to the lid 22. The pieces 46 and 48 add stiffness to the lid 22 so that the thickness of the aluminum forming the lid can be minimized, thus helping to keep the weight and cost of the cage as low as possible.

Figure 3:
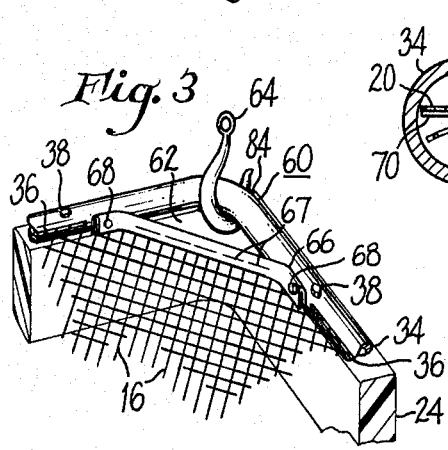
FIG. 3 is a perspective fragmentary view of a corner of the cage shown in FIGS. 1 and 2.

FIG. 3 shows a perspective view of one of the corners 60 of the cage. The netting material 16 is not secured to the tubing 34 in the corner, but instead bridges the corner. The upper edges of the netting are inserted in a section of plastic tubing 66 to cover the cut ends, and the tubing is compressed flat and stapled with staples 67. Then the ends of the tube 66 are fastened to the frame members 34 by means of bolts 68.

The foregoing corner construction leaves each corner of the frame free of netting so that a hook 64 (FIG. 3) can be inserted into the opening and under the corner of the tubing in order to assist in lifting the cage when it is loaded. Preferably, grooves 84 (see FIGS. 1 and 3) are formed at the corners of the float collar 24 in order to provide a passageway to facilitate the insertion of the hooks 64 underneath the tubing 34.

SIDE AND BOTTOM WALLS

The side and bottom walls of the cage are formed in the following manner. The netting material preferably is an extruded plastic netting material such as that sold under the trademark "Vexar" by DuPont. This material comes in rolls of a width equal to the desired depth of the walls of the cage (approximately 4 feet or 1.2 meters). A single piece is cut long enough to form the four sidewalls of the cage. The ends of this piece are fastened together so as to form a seam 54 (FIG. 1). The ends of the material at the seam 54 are secured together by means of relatively short sections 56 of polyethylene tubing which has been slit lengthwise to form a gap in it. Then, the ends of the netting are inserted into the gap, and staples 58 are driven through the polyethylene tubing and the ends of the netting inside the tubing, and the staples are clinched on the opposite side of the tubing.

Next, a separate panel 18 of netting is cut to form the bottom of the cage. The edges of the bottom panel are secured to the bottom edges of the side walls 14 and 16 to form seams 50 and 52 in the same manner as the seam 54 was formed. The seams 50 and 52 are shown in cross-section in FIG. 2. The procedure just described provides very strong seams which are easy and inexpensive to make.

FLOAT COLLAR

Preferably, the float collar 24 fits tightly all the way around the cage so as to form a "feed ring" for the cage; that is, it forms a ring which retains floating feed inside the cage and prevents it from escaping and being wasted. Furthermore, the float collar 24 fits tightly against the bottom of the tubing 34 in order to make the portion of the cage above the water insect-tight so that if insects are fed into the cage, or emerge from the water into the upper portion of the cage, they will not easily escape. The seams and crevices in the cage top also are made substantially insect-tight. If insects are fed, they will be fed through the feed hole 26, with a feeding device which will prevent escape of the insects. The feeding device can be located in the top plate 20 instead of in the lid 22, if desired.

an alternate and preferred location for the flotation material is under the top plate 20 rather than around the outside of the cage. The floats 25 which are so located are shown in dashed outline in FIGS. 1 and 2. The floats 25 extend completely around the inside of the cage under the top plate 20. The upper surfaces of the floats 25 are secured to the under-surface of the plate 20 by means of contact cement or by mechanical fasteners. The float 25 which is nearest and parallel to the cross-member 42 is of a volume somewhat greater than that of the other floats 25 in order to overcome the imbalance created by location of all of the floatation material on one side of the cage and thus keep the top of the cage level when floating. In this embodiment, the feed hole is located in the top plate 20 rather than in the lid 22. The feed hole $26^1$ and its grille $28^1$ in the latter location are shown in dashed outline in FIG. 1.

The location of the floats under the top plate 20 has the advantage that there the floats are protected from denting and breakage. Also, this structure provides a feed ring which will retain feed despite flexing or bowing of the netting material.

FABRICATION METHOD

In the method of fabricating the cage, straight lengths of the tubing 34 are cut to the proper length. Then, the gaps or slots 36 are formed by the simple procedure of cutting them with a power tool, such as an ordinary table saw or router. Since the material is aluminum, the saw or router will cut it relatively easily. The cuts are made so that they stop a certain distance short of each of the corners. This is done so that the corners will not be weakened by the cuts, and in order to facilitate bending the tubing.

Cutting slots in the tubing or pipe is preferred over extruding or otherwise forming the pipe with a gap because it can be more economical, since the pipe is a standard product which is made in large quantities, and because the process is easier. Furthermore, the cutting tool can leave the edges of the gap rough. This gives better gripping power to hold the netting and metal later inserted in the gap.

The next step in the fabrication process is to form the corner bends 60. This is done in conventional bending machines. Then the coupling sleeves 32 are cut to length and slotted in the same manner as the tubing 34. Next, the side walls of the cage are formed. First, the seam 54 is formed, and then, preferably, the resulting loop of material is fitted over a cubical form with the bottom edges of the netting up. Then a bottom sheet of netting is cut, laid on top of the form, and fastened to the side walls to form the bottom. The fastening steps are described above.

In processing the plastic tubing to form the seams, first it is straightened out, if it has been stored in roll form, and is slit along one side. Then it is cut into approximately 1 foot lengths. The 1 foot lengths are easier to apply, and their use makes the seams more flexible than if continuous lengths of material were used.

Next, the conduit sections 34 and the sleeves 32 are assembled together, and the upper edges of the side walls of the cage are inserted into the slots 36. Preferably, the slots 36 are substantially wider than necessary to receive the thickness of the sheet 20 and the netting material. This facilitates insertion. The ends of the cross-member 42 also are inserted into the slot 36.

Next, holes are drilled through the tubing, the ends of the sheet 20 and the netting material (and the sleeves 32, where they appear), and bolts are inserted, nuts attached, and tightened in order to clamp the edges of the gaps 36.

Next, the lid 22 is constructed and attached. Finally, the float collar 24 is fabricated in straight segments, one on each side, and the segments are joined together and fastened to the cage with the straps 80.

If preferred, the tubing can be clamped onto the netting and top sheet 20 without the use of bolts or the drilling of holes. After the materials have been inserted into the slots 36, the two halves of the tubing can be compressed together by means of a press-brake. The amount of pressure applied by the press-brake should be sufficient to permanently deform the tube enough to hold the netting and sheet metal tightly, but not enough to cut the netting.

If desired, especially for severe service in salt water, the tube joints and joints between the tube and top sheet 20 can be welded.

CONSTRUCTION MATERIALS

The materials of which the cage 10 is formed are corrosion and rust-resistant, strong and light-weight. The tubing 34, top plate 20, lid 22, handle 30, and hinges 42 preferably are made of aluminum. The diameter and thickness of the walls of the tubing 34 depends upon the maximum load to be placed in the cage. Almost all types of aluminum are impervious to corrosion when the cage is used in fresh water. However, if the cage is to be used in salt or brackish water, anodizing and/or painting with aluminum or other known paints may be necessary. The corrosion problem is minimized by the cage construction because none of the aluminum is in the water when the cage is in normal use.

The nuts and bolts used in the cage should be similarly corrosion-resistant. Cadmium-plated or stainless steel nuts and bolts are satisfactory.

The material for the float collar 24 also should be resistant to deterioration over a long period of time. It may be made of styrofoam, but preferably is made of polyethylene foam or polyvinylchloride foam, each of which is more resistant to tearing. The plastic straps 80 preferably are of polyethylene.

The netting material forming the sides and bottom of the cage can be one of a variety of materials. The preferred Vexar netting is made out of polyethylene. Polyethylene is preferred because it is relatively flexible and resistant to extremes of high and low temperatures. Polyethylene is extremely resistant to damage from minerals, salts, and other impurities in the water. Polypropylene also is suitably resistant to deterioration, but is stiffer and somewhat susceptible to brittleness at low temperatures. Woven nylon netting, coated with known preservatives, also can be used. However, it is believed to have a life which is somewhat shorter than that of the other materials, and may require re-coating with preservatives from time to time. Therefore, the first named materials are preferred over the nylon netting, despite the lower cost of the latter.

Another brand of polyethylene and polypropylene netting which is suitable is sold by Conwed Corporation, Minneapolis, Minn. Blends of polyethylene and polypropylene can be used under circumstances where the blend proves to be useful.

The tubing used to make the seams preferably is polyethylene, for the reasons given above in the selection of polyethylene for the netting material. The use of the slit tubing instead of a special extrusion is desirable from a cost standpoint because the tubing is made in large quantities for other purposes. Furthermore, as is shown in FIG. 2, the use of the tubing has the advantage that, when compressed by means of the staples 58, the edges of the tubing exert a resilient force against the netting material and helps hold the edges together. If desired, extruded channels of plastic materials such as polyethylene, polypropylene, etc. can be used instead of the tubing.

The staples 58 used also should be corrosion free and should have enough tensile strength to withstand the sometimes substantial loads lifted in the cage. For example, staples made of stainless steel or monel metal can be used.

As an alternative, instead of aluminum tubing 34 on the top frame, polyvinylchloride (PVC) tubing can be used. When such tubing is used, elbows can be used to form the corners with straight sections of tubing being fastened to the elbows by means of adhesives.

ALTERNATIVE EMBODIMENTS

Figure 5:
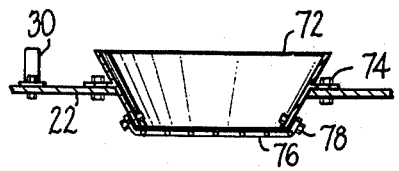
FIG. 5 is a cross-sectional view of a modified embodiment of the invention.

FIG. 5 shows a short funnel 72 secured in the feed hole 26 in place of the grille 28. A separate grille 76 is secured by bolts 78 to the bottom of the funnel 72. The funnel 72 is secured to the top of the lid 22 by means of tabs and bolts 74, the tabs extending outwardly from the outside of the funnel 72.

The funnel 72 provides enlargement of the opening into which feed can be thrown, thus reducing the amount of thrown feed which misses the feed hole and is wasted. Furthermore, the funnel reduces wasted feed by minimizing the amount which is thrown back out through the feed hole by the fish when feeding on floating food pellets. The fish often accidentally flip the pellets back out through the feed hole in the top of the prior cages, with the result that the feed pellets come to rest on the surface of the cage or in the surrounding water where they are eaten by birds, etc. The funnel forces such pellets to travel a greater distance in order to completely escape the cage, and also extends over a wider area so as to catch some of the pellets again which actually do come through the feed hole.

Other means can be used to clamp the edges of the gaps 36 in the tubing. Two methods have been described above; staples for flexible-walled materials, and bolts for stiff-walled materials. For stiff walled materials, sheet metal screws, rivets, or similar fasteners can be used. However, bolts and nuts are preferred so as to enable the user of the cage to easily take it apart for repairs.

Under certain circumstances it is possible to use the natural resilience of the tubing 34 itself to provide the clamping action and hold the materials in the gap 36. This can be done by making the gap 36 relatively smaller than needed to accommodate the material to be inserted in the gap, spreading the gap with a wedge type of tool, inserting the materials, and then removing the tool so as to allow the natural resiliency of the material to clamp the edges of the gap together.

It should be noted that the seams 50, 52 and 54 can be formed by means of stiff tubing (e.g., aluminum tubing) and clamping means as described above. However, the polyethylene tubing and stapling method is preferred because of its lower cost and because it produces a more flexible seam.

Under certain circumstances, it may be possible to secure the flexible netting to the top frame without the use of any clamping means. It is to be noted from FIG. 2 that the gap 36 extends in a generally horizontal direction, and the side walls 16 are vertical. Thus, the netting materials bends as it comes out of the gap 36. Material such as Vexar netting has a certain degree of stiffness which causes it to resist the bending, thus causing the material to push hard against the edges of the gap 36 when it is bent. This tends to create a frictional binding force between the metal and the netting and hold it in place. This effect can be enhanced by wrapping the netting material further around the periphery of the tube so as to increase the angle of the bend of the material.

If a stiff frame is desired for the cage shown in FIG. 1, it can be formed of tubing like the tubing 34. However, the construction omitting such framework and merely allowing the cage walls to hang downwardly under the force of gravity is believed to be superior both from a cost and a physical flexibility standpoint. The foldability and resulting improvement in ease of handling is another important consideration in favor of the flexible cage walls.

The cage can be made cylindrical in shape with substantially the same construction as shown. For example, a circular top frame formed by a circular tube 34 with a continuous slot can be used. A circular bottom then can be provided. The top plate 20 and the lid 22 each would be semi-circular in shape.

DISCUSSION

In accordance with the invention, a cage has been provided which has the advantages described above and meets the objectives set forth in the beginning of this specification. The cage is highly resistant to deterioration over the years, requires little or no maintenance, is light-weight, and is easy to load and unload. It has flexible walls which fold up so that the cage can be made compact to be stored and transported easily.

The edges of the netting material all are enclosed either inside the aluminum tubing 34, or the plastic tubing 56 or 66. Thus, there are no exposed edges of the netting to snag or tear.

It is easy to check on the health of the fish in the cage because the hinged lid is located near one edge. Thus, if the cage is located next to a dock, the aquaculturist can easily lift the lid and observe the fish feeding. This convenient location of the lid is even more important if the cages must be reached by means of a boat. The feed hole 26 similarly is located in an easy-to-reach location.

The cage is easy to unload because the opening in the top extends the full width of the cage. Furthermore, there are no ridges or ledges extending into the cage against which the fish or other animals can get caught as they are being dumped out of the cage. Thus, the contents of the cage can be dumped smoothly and easily. Moreover, a dip-net can be used to dip the animals out of the cage with ease.

The above description of the invention is intended to be illustrative and not limiting. Various changes or modifications in the embodiments described may occur to those skilled in the art and these can be made without departing from the spirit or scope of the invention. For example, use as a "cage" includes use as a hauling net or storage container, as well as use as a container for growing aquatic animals. As another example, the term "tubular" when used in this patent application can mean not only cylindrical tubes, but also square and rectangular tubes, channels with clinched-over edges, and any other members with re-entrant cross-sectional shapes.

We claim:

1. A cage for aquatic animals, said cage comprising an upper peripheral frame including an elongated netting support member having a re-entrant cross-sectional shape and a longitudinally extending gap formed therein, said gap opening towards the interior of said frame, netting material forming a basket depending from said frame, said netting material having upper edges and said upper edges extending laterally outwardly of the remainder of the netting material into said gap with said remainder of the netting material extending downwardly from said upper edges and gap at substantially right angles to the plane of the gap, clamping means extending through said support member and said upper edges of said netting material generally transversely of the plane of said gap for clamping the edges of the support member at said gap upon, and holding, said upper edges of said netting, and floatation means secured to said upper frame to float said cage upon a body of water with said basket immersed in the water.

2. A cage for aquatic animals, said cage comprising an upper peripheral frame including a tubular elongated peripheral netting support member having a re-entrant cross-sectional shape and a longitudinally extending gap formed therein, said gap having opposed side edges, being open towards the interior of said frame, and lying in a horizontal plane when the cage is in use; netting material forming a basket depending from said frame, said netting material having upper edges and said upper edges extending laterally outwardly of the remainder of the netting material into said gap with said remainder of the netting material extending downwardly from said upper edges and gap at substantially right angles to the plane of the gap, a top cover member having peripheral side edges substantially complementary to the peripheral configuration of said upper frame, said side edges of said top cover member being received within said gap, with said upper edge of the netting material, between the edges of said gap; said opposed side edges of said gap being clamped on said edges of the cover member and the upper edges of the netting and top cover member to said upper frame, and floatation means secured to said upper frame for buoyantly supporting the cage upon a body of water with said basket immersed in the water.

3. A cage for aquatic animals, said cage comprising a frame including an elongated netting support member with a re-entrant cross-sectional shape and a longitudinal gap, netting material forming walls for said cage, the edges of said netting material being located within said gap with the edges of said support member at said gap holding said netting, said netting forming side walls secured to said support member and a bottom wall, said netting being formed in panels joined together at seams, securing means for said seams, said securing means comprising elongated, generally-channel-shaped securing members with fasteners in said securing members and holding two edges of said netting inside said securing members.

4. A cage as in claim 3 in which said securing members are plastic tubes each with a gap, said netting edges being located within said gap, and said fasteners are staples driven through said tubes and netting edges.

5. An aquatic animal cage, said cage comprising a tubular peripheral top frame having a substantially horizontal longitudinally extending gap formed therein opening towards the interior of said frame, netting material having upper edges secured within said gap, said netting material hanging down from said upper edges at an angle thereto and forming side walls of said cage, a bottom wall for said cage, said bottom wall being secured to said side walls, and a stiff cover sheet having peripheral side edges and lying in the plane of said gap, said side edges of the cover sheet being secured within said gap with said upper edge of the netting material to form at least a partial cover for said cage.

6. A cage as in claim 5 including a hinged lid forming, together with said stiff sheet, a complete cover for said cage when said lid is closed.

7. An aquatic animal cage, said cage comprising a tubular top frame with a longitudinal gap, netting material with its edges secured within said gap and hanging down to form side walls of said cage, and a bottom wall for said cage, said bottom wall being secured to said side walls, said top frame being substantially rectilinear and being made of corrosion-resistant metal bent to form corners, with said gap ending at positions adjacent said corners, the netting being free from said frame at said corners and forming openings facilitating access to said frame at said corners for lifting.

8. A cage as in claim 7 in which ends of said frame tube abut one another at a joint, and including a rigid sleeve with a gap aligned with the first-named gap, said sleeve surrounding said tube ends and secured thereto to form a strong joint.

9. An aquatic animal cage, said cage comprising a tubular top frame with a longitudinal gap, netting material with its edges secured within said gap and hanging down to form side walls of said cage, and a bottom wall for said cage, said bottom wall being secured to said side walls, said netting walls being joined together at edge seams, each of said seams comprising a tubular member with a gap, the edges of two adjacent netting walls extending into the tubular member through said gap, and fasteners projecting through said tubular members and netting edges.

10. An aquatic animal cage, said cage comprising a tubular top frame with a substantially horizontal longitudinal gap, netting material with its edges secured within said gap and hanging down to form side walls of said cage, a bottom wall for said cage, said bottom wall being secured to said side walls, a stiff sheet with its edges secured within said gap to form at least a partial cover for said cage, and a hinged lid forming, together with said stiff sheet, a complete cover for said cage when said lid is closed; said lid having a hole formed therein and a grid over said hole, clamp members holding said grid onto said lid, said clamp members extending transversely of said lid to stiffen it.

11. An aquatic animal cage, said cage comprising a tubular top frame with a longitudinal gap, netting material with its edges secured within said gap and hanging down to form side walls of said cage, and a bottom wall for said cage, said bottom wall being secured to said side walls, said tubular top frame is made of cylindrical metal tubing bent into a generally rectilinear shape, a top sheet made of metal, the edges of said sheet being located in the gap in said tubing, threaded fasteners through said tubing, as well as the edges of said netting and said metal sheet which are located within said tubing, plastic float means secured to said cage adjacent said top frame, in which said netting walls are joined together at edge seams, each of said seams comprising a tubular member with a gap, the edges of two adjacent netting walls extending into the tubular member through said gap, and fasteners projecting through said tubular members and netting edges, each of said tubular members being a polyethylene tube, said netting being extruded polyethylene netting.

12. An aquatic animal cage, said cage comprising a tubular top frame with a substantially horizontal longitudinal gap, netting material with its edges secured within said gap and hanging down to form side walls of said cage, a bottom wall for said cage, said bottom wall being secured to said side walls, a stiff sheet with its edges secured within said gap to form at least a partial cover for said cage, and a hinged lid forming, together with said stiff sheet, a complete cover for said cage when said lid is closed; said cover having a feed hole formed therein, a funnel secured to said feed hole, and a protective grid over said funnel.

13. In a method of fabricating aquatic animal cages having a tubular frame and a basket having netting walls, the steps of providing a straight tube, slitting said tube longitudinally, inserting edges of said netting walls into the slit in said tube and clamping said edges together to hold said edges in said slit and secure said netting to said frame.

14. A method as in claim 13 in which said tubular frame is a bent metal frame, in which said slitting step is omitted in selected bending zones, including the step of bending said tube only in said zones, and separating said netting from the tubing of said frame, to leave free corners for grasping said frame.

15. A method as in claim 13 in which said tube is flexible, and two netting edges are inserted therein to form a seam, said clamping step including the step of driving clinching fasteners through said tube and said netting edges.

16. A method as in claim 13 including inserting a reinforcing panel in said slit, and projecting a fastener through said tube and said panel edge and netting edge inside said tube, and tightening said fastener to clamp the edges of said slit on said netting edge and said panel to form a top for said cage.

17. A method as in claim 13 including dimensioning said slit to be narrower than the nominal thickness of said netting, spreading said tube to widen said slit, and allowing said tube to return to clamp said netting between the edges of said slit.

18. A method as in claim 13 including dimensioning said slit to be wider than the nominal thickness of said netting, and compressing said tube to permanently deform it and clamp said netting between the edges of said slit.

19. An aquatic animal cage comprising an angular frame having corners, a netting basket with its upper edge secured to said frame except at said corners, with said netting being free from said frame at said corners and thus forming openings facilitating access to said frame at said corners for grasping said frame, and flotation material secured to said cage adjacent said frame to float said cage with said basket immersed in a body of water.

20. An aquatic animal cage comprising a frame, a netting basket secured to said frame, flotation material fastened to said cage, said basket being composed of a plurality of netting panels secured together at seams, securing means for said seams, said securing means comprising elongated, generally channel-shaped securing members with fasteners in said securing members and holding two edges of said netting inside said securing members.

* * * * *